US009239873B2

(12) United States Patent
Branch et al.

(10) Patent No.: US 9,239,873 B2
(45) Date of Patent: Jan. 19, 2016

(54) PROCESS-AWARE CODE MIGRATION

(71) Applicant: International Business Machines Corporation, Armonk, NY (US)

(72) Inventors: Joel W. Branch, Hamden, CT (US); Johnathan M. Reason, Port Chester, NY (US); Aubrey J. Rembert, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/926,229

(22) Filed: Jun. 25, 2013

(65) Prior Publication Data
US 2014/0379716 A1    Dec. 25, 2014

(51) Int. Cl.
G06F 17/30    (2006.01)
G06F 9/44     (2006.01)

(52) U.S. Cl.
CPC ............ *G06F 17/30598* (2013.01); *G06F 8/76* (2013.01)

(58) Field of Classification Search
CPC ............................ G06F 17/30598; G06F 8/76
USPC ........................................................ 707/738
See application file for complete search history.

(56) References Cited

U.S. PATENT DOCUMENTS

| | | |
|---|---|---|
| 6,442,663 B1 | 8/2002 | Sun et al. |
| 7,117,486 B2 | 10/2006 | Wong et al. |
| 7,565,631 B1 | 7/2009 | Banerjee et al. |
| 7,640,532 B2 | 12/2009 | Jain et al. |
| 2003/0088860 A1* | 5/2003 | Wang ............................ 717/153 |
| 2006/0048093 A1* | 3/2006 | Jain et al. ...................... 717/104 |
| 2006/0143222 A1 | 6/2006 | Daniel |
| 2007/0112879 A1* | 5/2007 | Sengupta ...................... 707/201 |
| 2008/0052693 A1* | 2/2008 | Archambault et al. ....... 717/151 |
| 2008/0306958 A1* | 12/2008 | Sreedhar .......................... 707/9 |
| 2009/0241128 A1* | 9/2009 | Curbera et al. ............... 719/320 |
| 2011/0029946 A1* | 2/2011 | Joukov et al. ................. 717/100 |
| 2011/0078667 A1* | 3/2011 | Dolby et al. .................. 717/133 |
| 2011/0321002 A1 | 12/2011 | Chen et al. |
| 2011/0321021 A1 | 12/2011 | Chen et al. |
| 2012/0198169 A1 | 8/2012 | Chen et al. |
| 2012/0278793 A1* | 11/2012 | Jalan et al. .................... 717/158 |
| 2012/0291004 A1 | 11/2012 | Kumar |

OTHER PUBLICATIONS

Chiang, Chia-Chu, et al., "Legacy Software Modernization", ICSMC 2006, Taipei, Oct. 6-11, 2006, pp. 1304-1309.*

(Continued)

*Primary Examiner* — Robert Stevens
(74) *Attorney, Agent, or Firm* — Francis Lammes; Stephen J. Walder, Jr.; Janice Kwon

(57) ABSTRACT

A mechanism is provided for process-aware code migration. A plurality of nodes and a plurality of edges are annotated within a call graph with information from execution data for executing the code and a topology of the data processing system to form an annotated call graph. Each node in the plurality of nodes is clustered into an associated cluster based on a subset of attributes used from the execution data or the topology to generate the annotated call graph to form a clustered call graph comprising a plurality of clusters. The execution data associated with each cluster in the plurality of clusters is process mined to form an existing process model. Processes identified within the existing process model are mapped to a proposed business-process model thereby forming a set of correlations between the existing process model and the proposed business-process model.

21 Claims, 9 Drawing Sheets

(56) References Cited

OTHER PUBLICATIONS

Panchenko, Oleksandr, et al., "Efficeint Storage and fast querying of source code", Information Systems Frontiers, vol. 13, Issue 3, Jul. 2011, pp. 349-357.*

Sereni, Damien, "Termination Analysis and Call Graph Construction for Higher-Order Functional Programs", IFCP '07, Freiburg, Germany, Oct. 1-3, 2007, pp. 71-83.*

* cited by examiner

PROCESS-AWARE CODE MIGRATION

BACKGROUND

The present application relates generally to an improved data processing apparatus and method and more specifically to mechanisms for process-aware migration of code.

During current business-process code migration projects, where an existing business-process is moved to a new information technology (IT) infrastructure, rarely is there a single comprehensive view of all software components comprised within the business-process and how these software components are deployed within a current IT infrastructure. Thus, difficulty exists in knowing how the migration might affect the execution of the business-process. This problem may further be exacerbated when modifications are to be implemented as part of the migration of the business-process (e.g., adding a new task). To build linkages between software, business-process models, and IT infrastructure, the current state-of-the-art business-process migration uses a three pronged approach:

1) identify a machine-to-machine topology via tooling (e.g., IBM® Tivoli® Composite Application Manager (ITCAM)),
2) identify software components running on the current IT infrastructure by manually conducting lengthy interviews with IT administrators that may last months and tie up many knowledgeable workers for the duration, and
3) map the discovered software components into the new IT infrastructure.

The primary problem in most code migration projects is in determining what parts of the code impact what aspects of the business-process. If a business model to software view is known, then there is a better chance of achieving a successful migration. However, the mapping of the business model to the current IT infrastructure is rarely known and, even if available, may not accurately represent what has been actually implemented.

SUMMARY

In one illustrative embodiment, a method, in a data processing system, is provided for (process-aware code migration. The illustrative embodiment annotates a plurality of nodes and a plurality of edges within a call graph with information from execution data for executing the code and a topology of the data processing system to form an annotated call graph. The illustrative embodiment clusters each node in the plurality of nodes into an associated cluster based on a subset of attributes used from the execution data or the topology to generate the annotated call graph to form a clustered call graph comprising a plurality of clusters. The illustrative embodiment process mines the execution data associated with each cluster in the plurality of clusters to form an existing process model. The illustrative embodiment maps processes identified within the existing process model to a proposed business-process model thereby forming a set of correlations between the existing process model and the proposed business-process model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for process-aware code migration. In order to improve current state-of-the-art business-process migration methods, the illustrative embodiments apply process-aware mechanisms that provide consultants/customers with processes to semi-automatically build the linkages between software components, business-process model, and information technology (IT) topology, thereby eliminating the need to conduct lengthy interviews to identify software components running on the current IT infrastructure. In addition, the illustrative embodiments address deficiencies in other business-process discovery tools by discovering business-process models when only IT based execution data exists.

Figure 1:
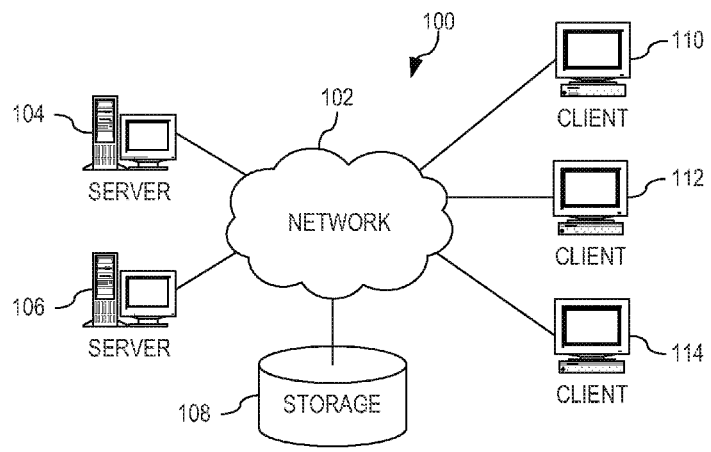
FIG. 1 is an example diagram of a distributed data processing system in which aspects of the illustrative embodiments may be implemented.
Figure 2:
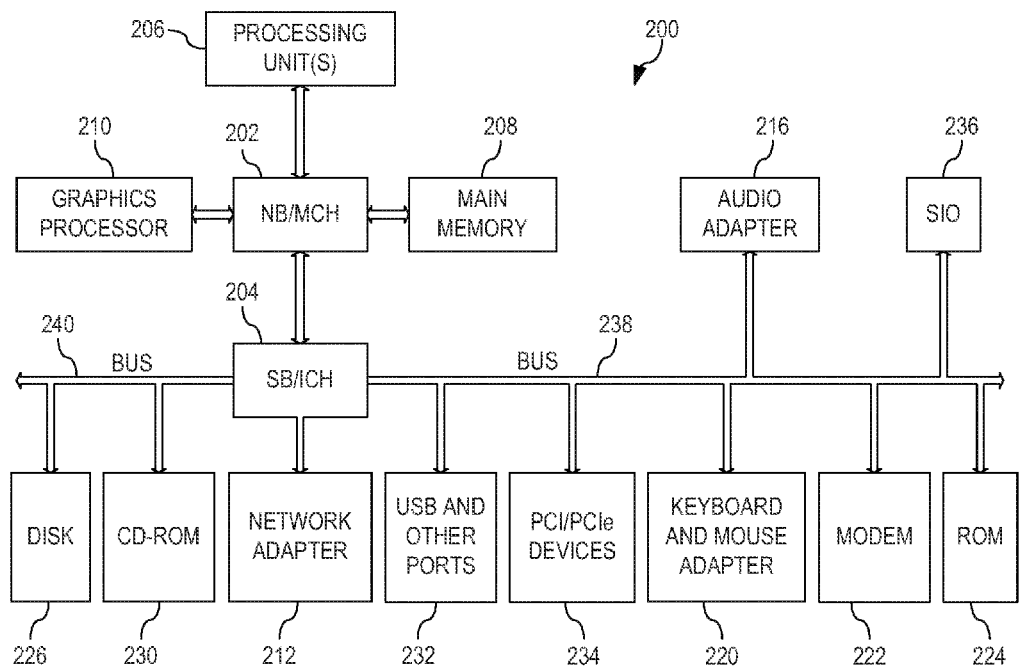
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As stated above, in order to implement a process-aware code migration mechanism within a data processing system. In order to improve current state-of-the-art business-process migrations, the illustrative embodiments apply process-aware mechanisms so that consultant/customers may semi-automatically build the linkages between software components, process model, and information technology (IT) topology, thereby eliminating the need to conduct lengthy interviews to identify software components running on the current IT infrastructure.

Figure 3:
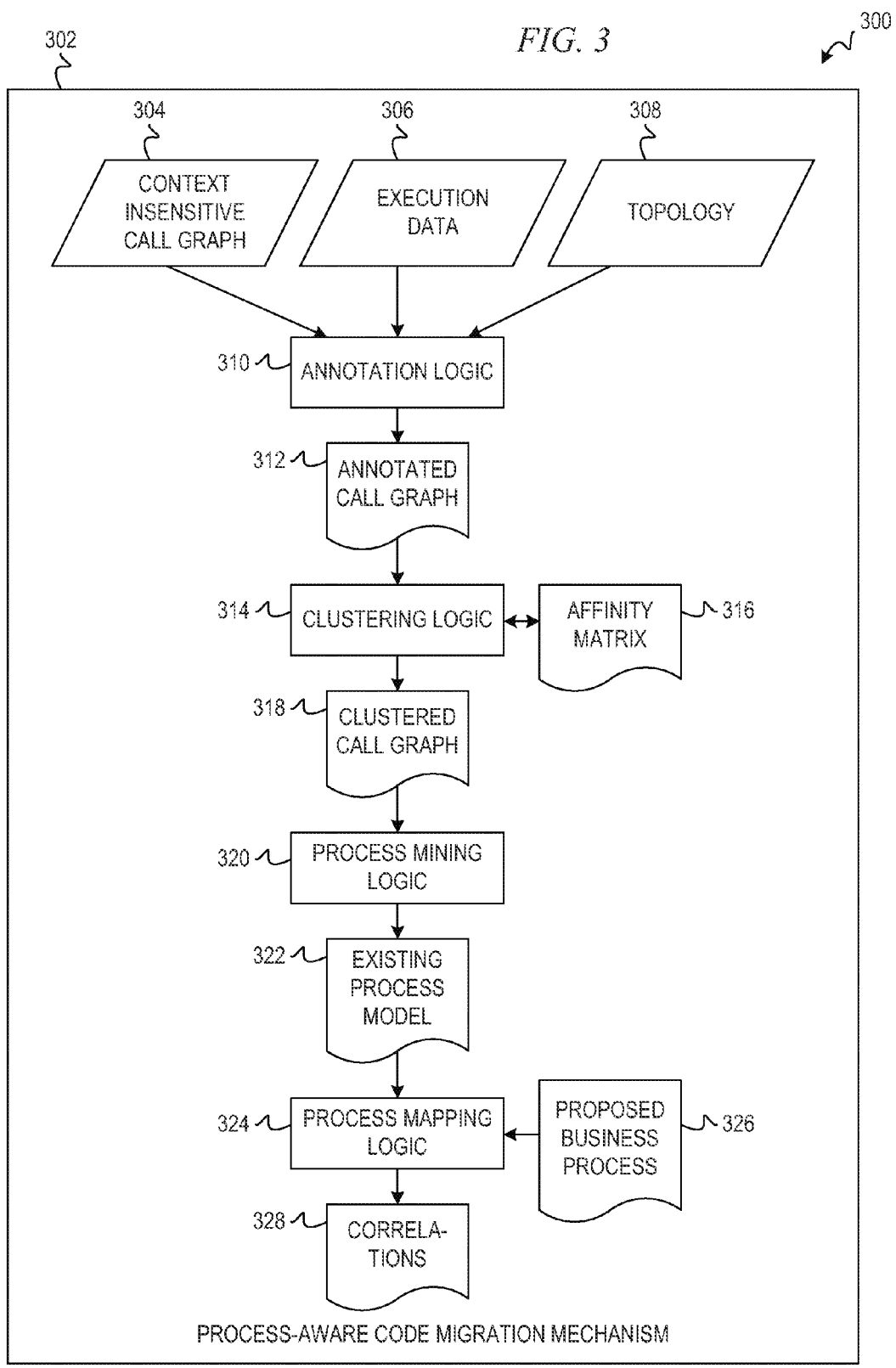
FIG. 3 depicts a process-aware code migration mechanism in accordance with an illustrative embodiment.
Figure 4:
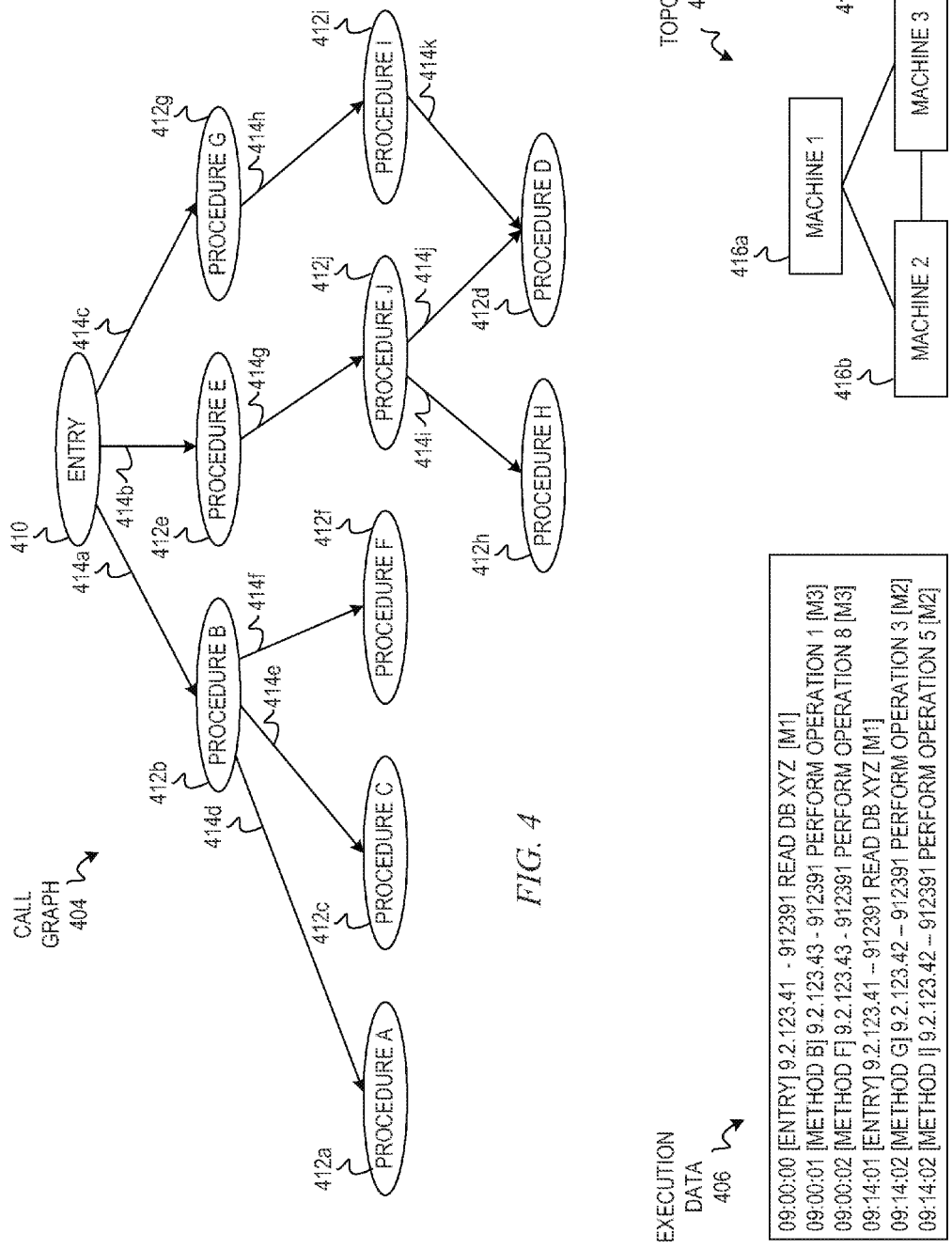
FIG. 4 depicts an example of a context insensitive call graph, execution data, and a topology in accordance with an illustrative embodiment.

FIG. 3 depicts a process-aware code migration mechanism in accordance with an illustrative embodiment. Process-aware code migration mechanism 302 within data processing system 300 has as inputs: context insensitive call graph 304, execution data 306, and topology 308. Context insensitive call graph 304 describes an interaction of procedures and procedure calls that realize the business-process that is to be migrated. Context insensitive call graph 304 may be generated by analyzing source code that realizes the business-process such that a node is generated for each procedure and an edge is generated for each node called by another node. Note that this is different than a context sensitive call graph where for each procedure, the graph contains a separate node representing the unique sequence of procedure calls that can lead to that procedure. Execution data 306 represents a dynamic behavior of the business-process. That is, during execution of code that realizes the business-process, any IT-level logging that might occur for provenance, compliance, or trouble shooting reasons may be recorded in the form of server logs, such as SQL transaction log, application debug logs, or the like. Process-aware code migration mechanism 302 receives this IT-level logging as execution data 306. Topology 308 represents the various hardware of a distributed data processing system, such as distributed data processing system 100 of FIG. 1 as well as a connectivity of that hardware within the distributed data processing system. FIG. 4 depicts an example of context insensitive call graph 404, execution data 406, and topology 408 in accordance with an illustrative embodiment. Context insensitive call graph 404 comprises entry point 410 and nodes 412a-412j illustrating how the procedures of nodes 412a-412j are reached by various procedures calls noted by edges 414a-414k. Execution data 406 comprises a subset of execution data from 09:00:00 through 09:14:02. Topology 408 illustrates that the IT infrastructure comprises machines 416a-416c and their interconnectivity.

Figure 5:
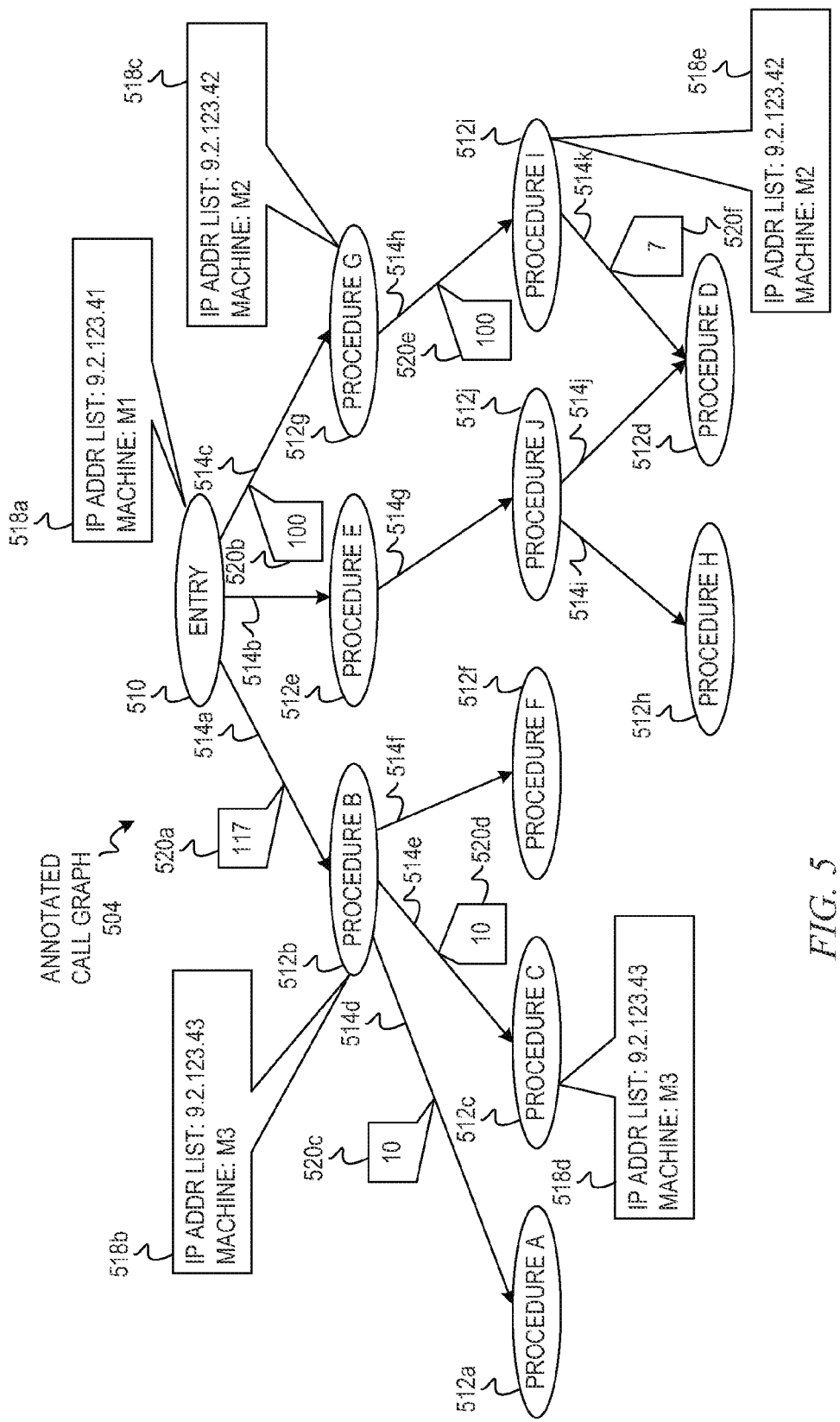
FIG. 5 depicts a partially annotated context insensitive call graph accordance with an illustrative embodiment.

Returning to FIG. 3, upon receiving the context insensitive call graph 304, execution data 306, and topology 308, annotation logic 310 within process-aware code migration mechanism 302 annotates the various nodes and edges within the context insensitive call graph 304 with attributes from execution data 306 and topology 308. Annotation logic 310 annotates the various nodes and edges in context insensitive call graph 304 to reflect one or more attributes associated with a particular procedure or procedure call to form annotated context insensitive call graph 312. In accordance with the illustrative embodiments, annotation logic 310 may annotate the various nodes and edges of the context insensitive call graph 304 with one or more associated attributes that may be in execution data 306 and/or topology 308, such as owner names, execution times, transaction identifiers, number of calls between procedures, or the like, thereby forming annotated context insensitive call graph 312. FIG. 5 depicts a partially annotated context insensitive call graph in accordance with an illustrative embodiment. As with context insensitive call graph 404 of FIG. 4, partially annotated context insensitive call graph 504 comprises entry point 510 and nodes 512a-512j illustrating how the procedures of nodes 512a-512j are reached by various procedures calls noted by edges 514a-514k. Additionally, partially annotated context insensitive call graph 504 also illustrates various node annotations 518a-518e and edge annotations 520a-520f. As an example of one of the node annotations, annotated context insensitive call graph 504 illustrates that node annotations 518e (procedure I) is called or executed 100 times on Machine 2 (M2) at Internet protocol (IP) address 9.2.123.42. Further, edge annotation 520e is annotated with a call value of 100.

Figure 6:
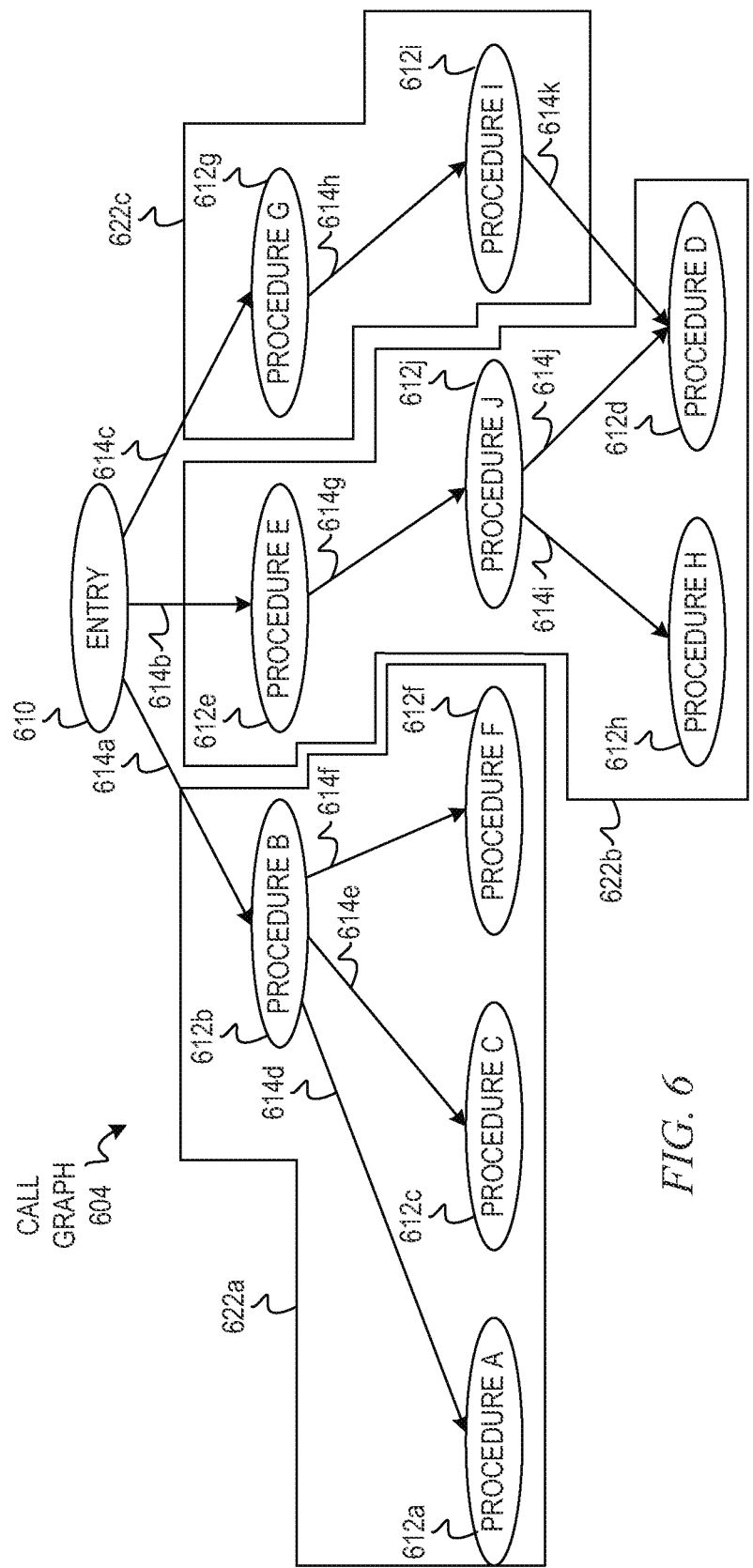
FIG. 6 depicts a clustered context insensitive call graph in accordance with an illustrative embodiment.

Returning to FIG. 3, once context insensitive call graph 304 has been annotated thereby forming annotated context insensitive call graph 312, clustering logic 314 within process-aware code migration mechanism 302 generates clusters of nodes within the annotated context insensitive call graph 312. That is, clustering logic 314 generates affinity matrix 316 based on which subset of attributes is used from execution data 306 and/or topology 308 to generate annotated context insensitive call graph 312. For example, if the desired clustering is directed to how software components are deployed, then clustering logic 314 generates affinity matrix 316 using a similarity function that only considers topology attributes, such as sever types, machine names, and IP address, or the like. On the other hand, if the desired clustering is directed to higher level business activities, then clustering logic 314 generates affinity matrix 316 using a similarity function that considers attributes that indicate similarities in functional execution, such as high occurrences of certain paths in annotated context insensitive call graph 312 within a same time slice, medium occurrences of certain paths in annotated context insensitive call graph 312 within a same time slice, low occurrences of certain paths in annotated context insensitive call graph 312 within a same time slice, or the like. Then, clustering logic 314 generates one or more clusters of nodes based on affinity matrix 316, each cluster comprising one or more nodes thereby forming clustered context insensitive call graph 318. FIG. 6 depicts a clustered context insensitive call graph in accordance with an illustrative embodiment. As with context insensitive call graph 404 of FIG. 4 and partially annotated context insensitive call graph 504 of FIG. 5, clustered context insensitive call graph 604 comprises entry point 610 and nodes 612a-612j illustrating how the procedures of nodes 612a-612j are reached by various procedures calls noted by edges 614a-614k. As is exemplified, clustered context insensitive call graph 604 illustrates that nodes 612a, 612b, 612c, and 612f are clustered into cluster 622a, nodes 612d, 612e, 612h, arid 612j are clustered into cluster 622b, and nodes 612g and 612i are clustered into cluster 627c.

Returning to FIG. 3, once annotated context insensitive call graph 312 has been clustered thereby forming clustered context insensitive call graph 318, process mining logic 320 within process-aware code migration mechanism 302 performs process mining on execution data 306. In order to perform the process mining, process mining logic 320 logically removes entry and/or library calls from execution data 306. Process mining logic 320 then groups entries in execution data 306 together that are part of a same cluster and have identical transaction identification or are in a similar time slice. Process mining logic 320 then generates an abstract activity name for each of the grouped entries. Process mining logic 320 may generate the abstract activity names based on textual features of the procedures of the methods. Process mining logic 320 then generates rendering of an existing process model 322 as identified from context insensitive call graph 304, execution data 306, and topology 308.

Figure 7:
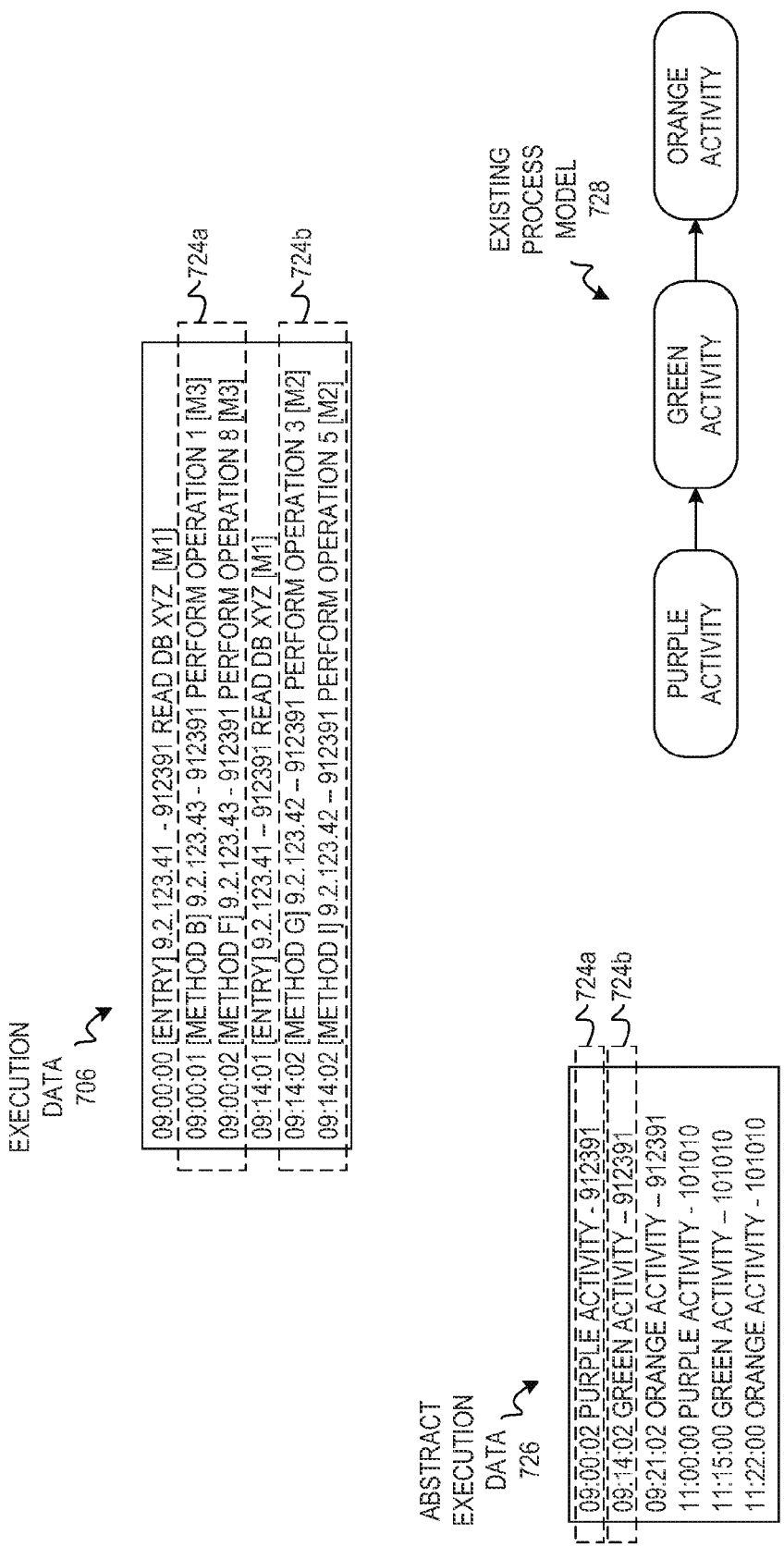
FIG. 7 depicts an exemplary process mining process in accordance with an illustrative embodiment.

FIG. 7 depicts an exemplary process mining process in accordance with an illustrative embodiment. Execution data 706 represents the same execution data as execution data 406 of FIG. 4. As is illustrated, the process mining logic logically removes entry and/or library calls from execution data 706 and groups entries in execution data 706 together as is illustrated by groupings 724a and 724b. As is illustrated, grouping 724a has identical transaction identification and is in similar time slice. Similarly, grouping 724b has identical transaction identification and is in a similar time slice. Thus, by the process mining logic performing the process mining process, the process mining logic generates abstract execution data 726 in which groupings 724a and 724b are the first two entries and where the groupings 724a and 724b have abstract activity name. That is, the process mining logic has assigned the abstract activity name of "Purple Activity" to grouping 724a and the abstract activity name of "Green Activity" to grouping 724b. The process mining logic then generates rendering of an existing process model 728 as identified from inputs of the context insensitive call graph, the execution data, and the topology.

Returning to FIG. 3, with rendering of an existing process model 322, process mapping logic 324 within process-aware code migration mechanism 302 maps the processes identified within rendering of an existing process model 322 to proposed business-process model 326. Utilizing data from one or more of context insensitive call graph 304, execution data 306, topology 308, annotated context insensitive call graph 312, and clustered context insensitive call graph 318, process mapping logic 324 generates a reasonable correlation between the abstract activity names in rendering of an existing process model 322 to activity names in proposed business-process model 326 resulting in a rendering of correlations 328. After generating rendering of correlations 328, process mapping logic 324 provides the rendering of correlations 328 to a client's domain expert for further adjustments.

Figure 8:
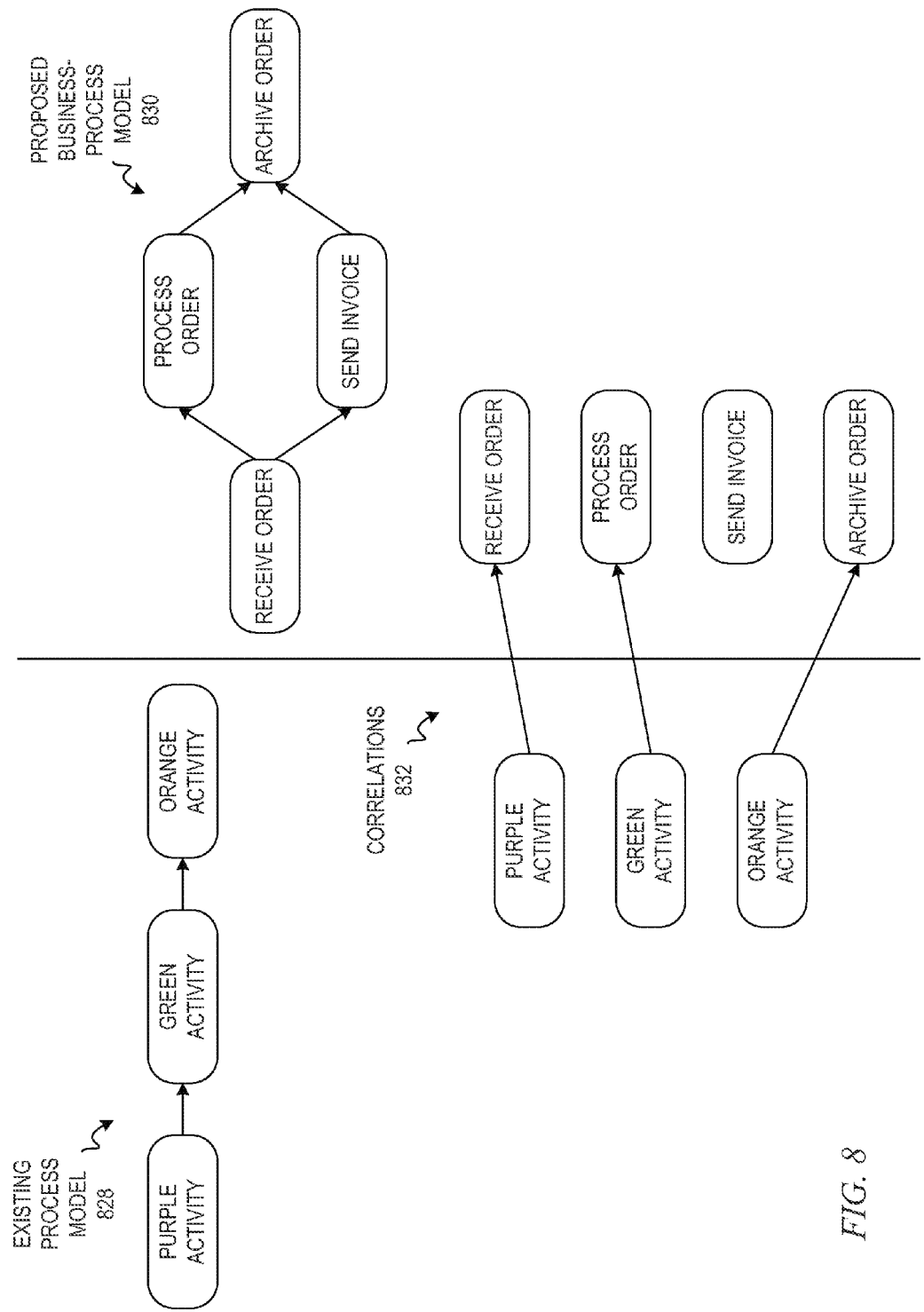
FIG. 8 depicts an exemplary process mapping of a rendering of an existing process model to a proposed business-process model in accordance with an illustrative embodiment.

FIG. 8 depicts an exemplary process mapping of a rendering of an existing process model to a proposed business-process model in accordance with an illustrative embodiment. As is illustrated, rendering of an existing process model 828 is the same as rendering of an existing process model 728 of FIG. 7. As described with relation to process mapping logic 324 of FIG. 3, the process mapping logic receives rendering of an existing process model 828 as well as proposed business-process model 830. Utilizing data from one or more of the input context insensitive call graph, execution data, and topology, as well as data from the annotated context insensitive call graph and the clustered context insensitive call graph, the process mapping logic generates a reasonable correlation between the abstract activity names in rendering of an existing process model 828 to activity names in proposed business-process model 830 resulting in a rendering of correlations 832.

Thus, as an improvement to the current state-of-the-art business-process migration methods where a user has to identify a server-to-machine topology, identify software components running on the current information technology (IT) infrastructure by manually conducting lengthy interviews with IT administrators that may last months and tie up many knowledgeable workers for the duration, and map the discovered software components into the new IT infrastructure, the process that would normally have taken weeks, may be significantly reduced with the utilization of a process-aware code migration mechanism, such as process-aware code migration mechanism 302 of FIG. 3. Knowing what software components map to the different activities in a proposed business-process model enables the process-aware code migration mechanism to provide a rendering of correlations such that the client's domain expert may readily identify the reusable software components, the interdependent components, and the server/hardware requirements of components, all from a business process model view.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 9:
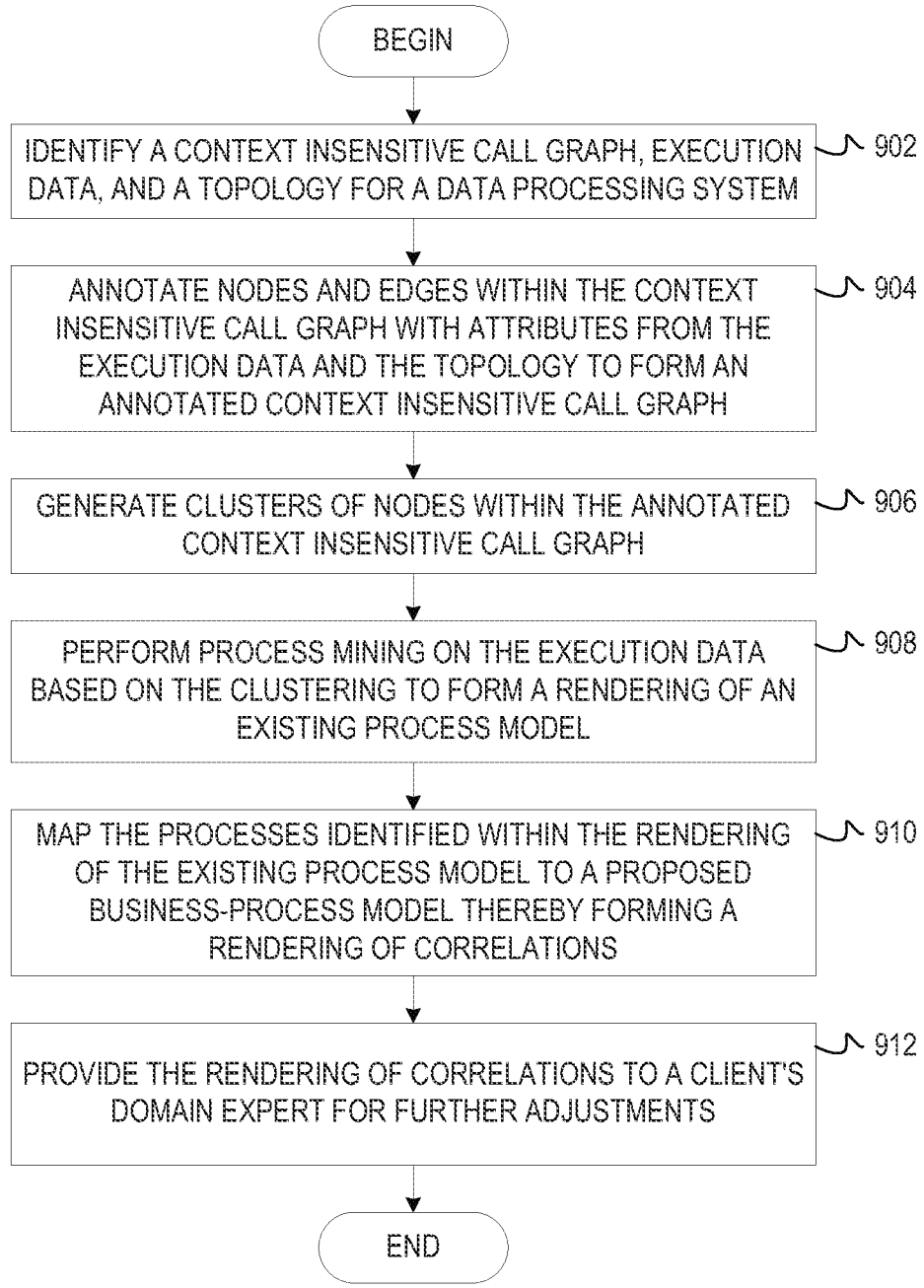
FIG. 9 depicts a flow diagram of the operation performed by a process-aware code migration mechanism for process-aware code migration in accordance with an illustrative embodiment.

FIG. 9 depicts a flow diagram of the operation performed by a process-aware code migration mechanism for process-aware code migration in accordance with an illustrative embodiment. As the operation begins, the process-aware code migration mechanism identifies a context insensitive call graph, execution data, and a topology for a data processing system (step 902). Annotation logic within the process-aware code migration mechanism annotates various nodes and edges within the context insensitive call graph with attributes from the execution data and the topology to form an annotated context insensitive call graph (step 904). That is, the annotation logic annotates the various nodes and edges in context insensitive call graph to reflect one or more attributes associated with a particular procedure or procedure call to form the annotated context insensitive call graph. Once the annotated context insensitive call graph is generated, clustering logic within the process-aware code migration mechanism generates clusters of nodes within the annotated context insensitive call graph based on which subset of attributes is used from the execution data and/or the topology to generate the annotated context insensitive call graph thereby forming a clustered context insensitive call graph (step 906).

Once the clustered context insensitive call graph is generated, process mining logic within the process-aware code migration mechanism performs process mining on the execution data based on the clustering to form a rendering of an existing process model (step 908). With the process mining complete, the process-aware code migration mechanism maps the processes identified within the rendering of the existing process model to a proposed business-process model thereby forming a rendering of correlations (step 910). The process-aware code migration mechanism then provides the rendering of correlations to a client's domain expert for further adjustments (step 912), with the operation ending thereafter.

Figure 10:
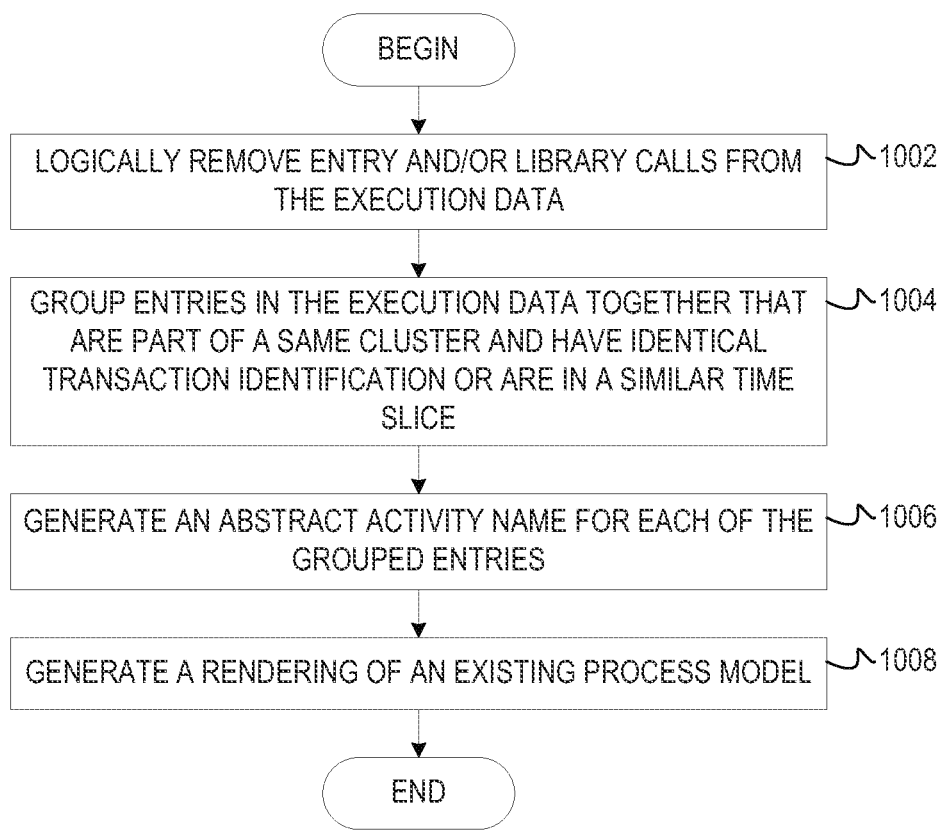
FIG. 10 depicts a flow diagram of the detailed operation performed in process mining in accordance with an illustrative embodiment.

FIG. 10 depicts flow diagram of the detailed operation performed in process mining in accordance with an illustrative embodiment. As the operation begins, the process-aware code migration mechanism logically removes entry and/or library calls from the execution data (step 1002). The process-aware code migration mechanism groups entries in the execution data together that are part of a same cluster and have identical transaction identification or are in a similar time slice (step 1004). The process-aware code migration mechanism generates an abstract activity name for each of the grouped entries (step 1006). The process-aware code migration mechanism then generates a rendering of an existing process model as identified from the context insensitive call graph, the execution data, and the topology (step 1008), with the operation ending thereafter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for process-aware code migration. The illustrative embodiments apply process-aware mechanisms that provide consultants/customers with processes to semi-automatically build the linkages between software components, business-process model, and information technology (IT) topology, thereby eliminating the need to conduct lengthy interviews to identify software components running on the current IT infrastructure. In addition, the illustrative embodiments address deficiencies in other business-process discovery tools by discovering business-process models when only IT based execution data exists.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for process-aware code migration, the method comprising:
   annotating a plurality of nodes and a plurality of edges within a call graph with information from execution data for executing the code and a topology of the data processing system to form an annotated call graph;
   clustering each node in the plurality of nodes into an associated cluster based on a subset of attributes used from the execution data or the topology to generate the annotated call graph to form a clustered call graph comprising a plurality of clusters;
   process mining the execution data associated with each cluster in the plurality of clusters to form an existing process model; and
   mapping processes identified within the existing process model to a proposed business-process model thereby forming a set of correlations between the existing process model and the proposed business-process model.

2. The method of claim 1, further comprising:
   providing the set of correlations to a client's domain expert.

3. The method of claim 1, wherein annotating the plurality of nodes and the plurality of edges the call graph causes the plurality of nodes and the plurality of edges to reflect one or more associated attributes associated with one or more of a particular procedure, a procedure call, or a hardware device, wherein the procedure and the procedure call are identified from execution data and wherein the hardware device is identified from a topology of the data processing system.

4. The method of claim 1, wherein process mining the execution data associated with each cluster in the plurality of clusters further comprises:
   logically removing entry and library calls from the execution data;
   grouping entries in the execution data together that are part of a same cluster and have identical transaction identification;
   generating an abstract activity name for each of the grouped entries; and
   generating the existing process model as identified from the call graph, the execution data, and the topology using the abstract activity name for each of the grouped entries.

5. The method of claim 1, wherein process mining the execution data associated with each cluster in the plurality of clusters further comprises:
   logically removing entry and library calls from the execution data;
   grouping entries in the execution data together that are part of a same cluster and are in a same time slice;
   generating an abstract activity name for each of the grouped entries; and
   generating the existing process model as identified from the call graph, the execution data, and the topology using the abstract activity name for each of the grouped entries.

6. The method of claim 1, wherein the call graph is generated by analyzing source code that realizes a business-process such that a node is generated for each procedure and an edge is generated for each node called by another node, wherein the execution data represents a dynamic behavior of the business-process, and wherein the topology represents hardware of the data processing system and a connectivity of the hardware within the data processing system.

7. The method of claim 1, wherein clustering each node in the plurality of nodes into an associated cluster comprises:
   generating an affinity matrix based on the subset of attributes used from e execution data or the topology to generate the annotated call graph; and
   generating the plurality of clusters based on the affinity matrix, wherein each cluster comprises one or more nodes of the plurality of nodes.

8. A computer program product comprising a non-transitory computer readable storage medium having a computer readable program stored therein, wherein the computer readable program, when executed on a computing device, causes the computing device to:

annotate a plurality of nodes and a plurality of edges within a call graph with information from execution data for executing the code and a topology of the data processing system to form an annotated call graph;

cluster each node in the plurality of nodes into an associated cluster based on a subset of attributes used from the execution data or the topology to generate the annotated call graph to form a clustered call graph comprising a plurality of clusters;

process mine the execution data associated with each cluster in the plurality of clusters to form an existing process model; and map processes identified within the existing process model to a proposed business-process model thereby forming a set of correlations between the existing process model and the proposed business-process model.

9. The computer program product of claim 8, wherein the computer readable program further causes the computing device to:

provide the set of correlations to a client's domain expert.

10. The computer program product of claim 8, wherein the computer readable program to annotate the plurality anodes and the plurality of edges the call graph causes the plurality of nodes and the plurality of edges to reflect one or more associated attributes associated with one or more of a particular procedure, a procedure call, or a hardware device, wherein the procedure and the procedure call are identified from execution data and wherein the hardware device is identified from a topology of the data processing system.

11. The computer program product of claim 8, wherein the computer readable program to process mine the execution data associated with each cluster in plurality of clusters further causes the computing device to:

logically remove entry and library calls from the execution data;

group entries in the execution data together that are part of a same cluster and have identical transaction identification;

generate an abstract activity name for each of the grouped entries; and generate the existing process model as identified from the call graph, the execution data, and the topology using the abstract activity name for each of the grouped entries.

12. The computer program product of claim 8, wherein the computer readable program to process mine the execution data associated with each cluster in the plurality of clusters further causes the computing device to:

logically remove entry and library calls from the execution data;

group entries in the execution data together that are part of a same cluster and are in a same time slice;

generate an abstract activity name for each of the grouped entries; and generate the existing process model as identified from the call graph, the execution data, and the topology using the abstract activity name for each of the grouped entries.

13. The computer program product of claim 8, wherein the call graph is generated by analyzing source code that realizes a business-process such that a node is generated for each procedure and an edge is generated for each node called by another node, wherein the execution data represents a dynamic behavior of the business-process, and wherein the topology represents hardware of the data processing system and a connectivity of the hardware within the data processing system.

14. The computer program product of claim 8, wherein the computer readable program to cluster each node in the plurality of nodes into an associated cluster further causes the computing device to:

generate an affinity matrix based on the subset of attributes used from the execution data or the topology to generate the annotated call graph; and generate the plurality of clusters based on the affinity matrix, wherein each cluster comprises one or more nodes of the plurality of nodes.

15. An apparatus comprising:

a processor; and a memory coupled to the processor, wherein the memory comprises instructions which, when executed by the processor, cause the processor to:

annotate a plurality of nodes and a plurality of edges within a call graph with information from execution data for executing the code and a topology of the data processing system to form an annotated call graph;

cluster each node in the plurality of nodes into an associated cluster based on a subset of attributes used from the execution data or the topology to generate the annotated call graph to form a clustered call graph comprising a plurality of clusters;

process mine the execution data associated with each cluster in the plurality of clusters to form an existing process model; and map processes identified within the existing process model to a proposed business-process model thereby forming a set of correlations between the existing process model and the proposed business-process model.

16. The apparatus of claim 15, wherein the instructions further cause the processor to:

provide the set of correlations to a client's domain expert.

17. The apparatus of claim 15, wherein the instructions to annotate the plurality of nodes and the plurality of edges the call graph causes the plurality of nodes and the plurality of edges to reflect one or more associated attributes associated with one or more of a particular procedure, a procedure call, or a hardware device, wherein the procedure and the procedure call are identified from execution data and wherein the hardware device is identified from a topology of the data processing system.

18. The apparatus of claim 15, wherein the instructions to process mine the execution data associated with each cluster in the plurality of clusters further cause the processor to:

logically remove entry and library calls from the execution data;

group entries in the execution data together that are part of a same cluster and have identical transaction identification;

generate an abstract activity name for each of the grouped entries; and generate the existing process model as identified from the call graph, the execution data, and the topology using the abstract activity name for each of the grouped entries.

19. The apparatus of claim 15, wherein the instructions to process mine the execution data associated with each cluster in the plurality of clusters further cause the processor to:

logically remove entry and library calls from the execution data;

group entries in the execution data together that are part of a same cluster and are in a same time slice;

generate an abstract activity name for each of the grouped entries; and generate the existing process model as identified from the call graph, the execution data, and the topology using the abstract activity name for each of the grouped entries.

20. The apparatus of claim 15, wherein the call graph is generated by analyzing source code that realizes a business-process such that a node is generated for each procedure and an edge is generated for each node called by another node, wherein the execution data represents a dynamic behavior of the business-process, and wherein the topology represents hardware of the data processing system and a connectivity of the hardware within the data processing system.

21. The apparatus of claim 15, wherein the instructions to cluster each node in the plurality of nodes into an associated cluster further cause the processor to:

generate an affinity matrix based on the subset of attributes used from the execution data or the topology to generate the annotated call graph; and generate the plurality of clusters based on the affinity matrix, wherein each cluster comprises one or more nodes of the plurality of nodes.

\* \* \* \* \*